No. 701,632. Patented June 3, 1902.
A. F. SHRIVER, Dec'd.
H. SHRIVER, Administratrix.
COFFEE FILTER.
(Application filed Jan. 9, 1902.)
(No Model.)
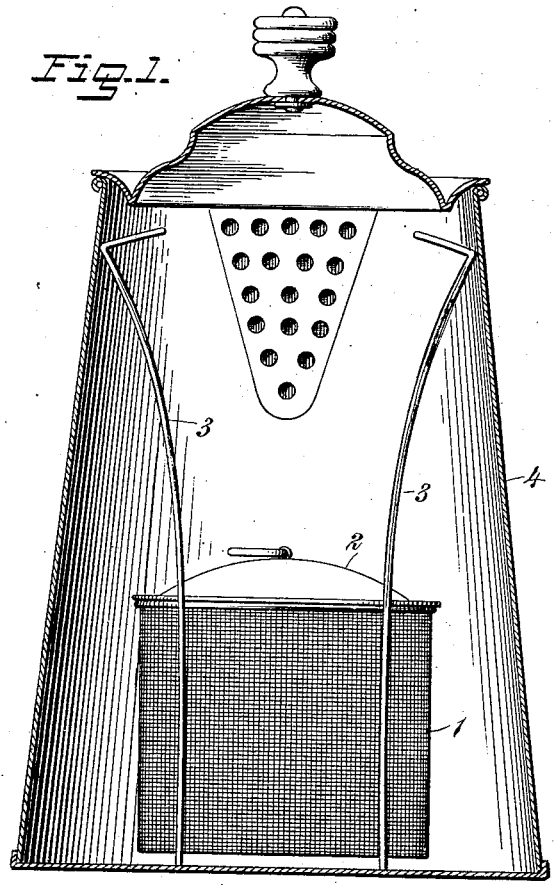
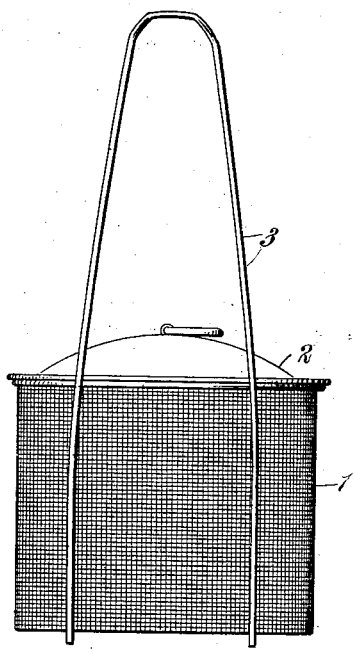
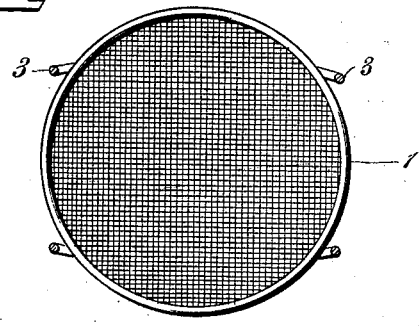
WITNESSES:
INVENTOR
Henrietta Shriver
Administratrix of the Estate of
Augustus F. Shriver
deceased
BY
ATTORNEYS

UNITED STATES PATENT OFFICE.

HENRIETTA SHRIVER, OF ARBUCKLE, CALIFORNIA, ADMINISTRATRIX OF AUGUSTUS F. SHRIVER, DECEASED, ASSIGNOR TO MORRIS ZOBERBIER AND SAMUEL B. CALDWELL, OF SAN FRANCISCO, CALIFORNIA.

COFFEE-FILTER.

SPECIFICATION forming part of Letters Patent No. 701,632, dated June 3, 1902.

Application filed January 9, 1902. Serial No. 89,008. (No model.)

*To all whom it may concern:*

Be it known that I, HENRIETTA SHRIVER, a citizen of the United States, and a resident of Arbuckle, in the county of Colusa and State of California, administratrix of the estate of AUGUSTUS F. SHRIVER, deceased, (late a citizen of the United States, and a resident of Arbuckle, in the county of Colusa and State of California, as by reference to the duly-certified copy of letters testamentary hereto annexed will more fully appear,) who did in his lifetime invent certain new and useful Improvements in Coffee-Filters, do hereby declare the following to be a full, clear, and exact description of said invention.

This invention relates to improvements in devices for holding and filtering coffee or the like while boiling or steeping; and the object is to provide a filter of simple construction that may be readily inserted or removed from a coffee-pot and by means of which the grounds may be lifted out or above the liquid, thus avoiding the impairing of the flavor.

I will describe a coffee-filter embodying the invention and then point out the novel features in the appended claim.

Reference is to be had to the accompanying drawings, forming a part of this specification, in which similar characters of reference indicate corresponding parts in all the figures.

Figure 1 is a sectional elevation of a coffee-pot, showing a filter embodying the invention as arranged therein. Fig. 2 is a side view of the filter, and Fig. 3 is a plan view thereof with the cover removed.

The filter 1 is made in the form of a cup, the side walls and bottom of which are perforated or made of sieve material, and the filter is provided with a cover 2. Attached to the opposite sides of the filter are upwardly-extending spring yielding arms 3, each arm consisting of a single length of wire bent to form two members, the upper portions of which are curved outward and designed to engage with the sides of the coffee pot or vessel 4 to prevent any lateral movement of the filter, and the upper ends are turned inward to serve as handles for removing or inserting the filter. To permit the water to circulate freely through the bottom of the filter, it is supported when in position somewhat above the bottom of the coffee-pot, and for this purpose the ends of the arms 3 are extended below the bottom to form legs, as clearly indicated in Fig. 1.

In operation the coffee is to be placed in the filter, which is to be inserted in the coffee-pot with the required quantity of water. After boiling the filter containing the coffee-grounds is to be raised above the surface of the liquid and permitted to drain, or it may be wholly removed.

Having thus described the invention, what is claimed as new, and desired to be secured by Letters Patent, is—

For use in connection with a coffee-pot or the like, a filter having perforated sides and bottom walls, spring yielding arms extended upward from opposite sides of the filter, each arm consisting of a single length of wire bent to form two members which at the upper portion are curved outward and then inward, and downward extensions on said arms forming legs to support the filter upon the bottom of the pot, substantially as specified.

In testimony whereof I have signed my name to this specification in the presence of two subscribing witnesses.

HENRIETTA SHRIVER,
*Administratrix of the estate of Augustus F. Shriver, deceased.*

Witnesses:
L. O. JOHNSON,
J. W. HOLLISTER.